MAGNETIC COMPRESSION METHOD

Original Filed April 26, 1952

INVENTOR.
Dorothy L. Blaney
BY Morris A. Rabkin
ATTORNEY

United States Patent Office 2,816,175

Patented Dec. 10, 1957

2,816,175

MAGNETIC COMPRESSION METHOD

Dorothy L. Blaney, Los Angeles, Calif., assignor to Radio Corporation of America, a corporation of Delaware Original application April 26, 1952, Serial No. 284,595. Divided and this application January 9, 1953, Serial No. 330,551

7 Claims. (Cl. 179—100.2)

This invention relates to magnetic sound recording and reproduction, and particularly to a method of automatically obtaining compression of the signal during recording. This application is a division of a continuation-in-part application, Ser. No. 284,595, filed April 26, 1952.

In the production of motion pictures, wherein a concomitant sound for the picture is recorded on a photographic sound track which is reproduced during the projection of the picture, compression of the higher amplitudes of the signal has been found desirable for several reasons. For instance, since the sound track area has a definite level range where the relationship between input and output is linear, a wider range may be recorded by compressing the higher amplitudes of a signal at a predetermined rate. Compression also provides a safety feature in the event the level suddenly increases beyond the upper range of the film. Furthermore, a compressed signal has been found to be more intelligible when reproduced in the average theater at high levels, even though some distortion is introduced in the wave shape of the signal.

With the advent of magnetic recording in the production of motion pictures, it has also been found desirable to compress the signal at some point in the recording channel. Although this compression may be done electronically, the present invention is directed to a system for automatically compressing the high level signals by operating either on the shoulder of the magnetic characteristic curve of the magnetic record medium, or on the shoulder or saturation portion of the recording head characteristic curve. When using the core characteristic curve, variations in the width of the rear gap of the core of the magnetic head will result in various degrees of compression. Also, a direct current of different values through the head winding may be used to shift the point at which compression occurs and the amount of compression. The system may be set manually to provide different signal levels at which compression occurs or begins and to provide certain amounts of compression above said levels, and the variations may be accomplished automatically with the variation in the average value of the signal level.

The principal object of the invention, therefore, is to facilitate the recording of magnetic sound records.

Another object of the invention is to provide an improved method of obtaining compression in the recording of magnetic records.

A further object of the invention is to provide an improved method of automatically compressing high amplitudes of a signal being recorded magnetically either by fixed settings or in accordance with the average variations in the signal level.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
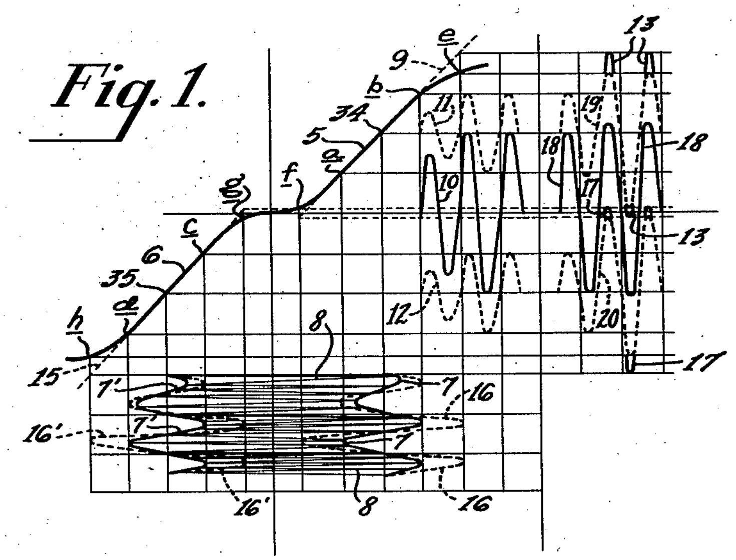
Fig. 1 is a graph illustrating the operation of the compression method of the invention.
Figure 2:
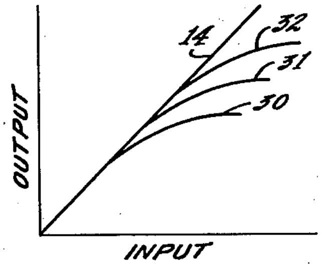
Fig. 2 is a graph showing the relationship between input and output obtainable with the invention.

Referring now to the graph shown in Fig. 1, 5 and 6 represent, for purposes of illustration, a magnetic characteristic curve between either the current in the recording head coil and the leakage flux in the air gap of the core of the head, or the characteristic curve between the flux introduced into a magnetic record carrier and the magnetism produced therein. In the normal manner of recording, a magnetic bias is applied to the coil, which utilizes the range which extends over only the straight portions of the curve, as shown between points *a*—*b* and *c*—*d*. There is thus provided a linear relationship between the variations in the signal level and the magnetism produced in the record carrier. To illustrate this action, an audio wave 7—7′ is shown combined with a high frequency carrier bias wave 8, shown in full lines, the maximum level of the audio wave shifting the peaks of the bias wave different amounts between points *a*—*b* and *c*—*d*, in accordance with the amplitude of the audio signal. If the amplitude never goes beyond points *a, b, c,* and *d*, a linear relationship will always exist between the input and output signal, as shown by the final output wave in full lines 10, which is made up of the waves shown by dotted lines 11 and 12. This linear relationship is illustrated by rectilinear curve 14 in Fig. 2.

If it is now desired to obtain compression of the wave 7—7′, the level of the wave as impressed on the coil of the head may be increased, or the level of the bias wave 8 may be increased. The result of increasing the level of the audio wave is illustrated by proportionately increasing the peaks of wave 7—7′, as shown by the dotted lines 16—16′. By this amount of audio level increase, the degree of compression obtained is in accordance with the curvature of the characteristic curve 5—6, between points *b*—*e, a*—*f, c*—*g, and d*—*h*. The resulting compressed wave is now shown by solid curve 18 made up of dotted wave curves 19 and 20. If the wave were not compressed, it would appear as the combination of wave curves 19 and 20 with the additional solid line peaks 13 and 17 obtained by extending the straight portions of curve 5—6, as shown at 9 and 15. For greater amounts of compression, the audio signal level could be proportionately increased to utilize more of the curved shoulder portions of the curve 5—6. Thus, various degrees of compression are obtainable, as illustrated by curves 30, 31, and 32 in Fig. 2, it being noted that the output wave is substantially equally compressed for equally high peaks, since the wave 8 and wave 7—7′ combine about the points 34 and 35, mid-way on the straight portions of curve 5—6.

Figure 3:
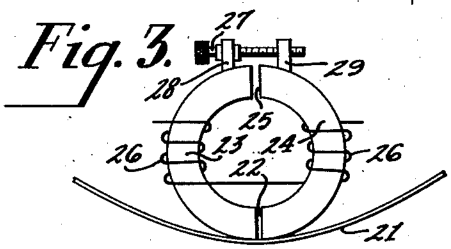
Fig. 3 is a view of a magnetic recording head constructed to perform the method of the invention.

Various degrees of compression may also be obtained by the use of the magnetic characteristic curve of the magnetic head. Referring now to Fig. 3, a film 21 is shown passing over the recording gap 22 of the core sections 23 and 24 of a recording head, the rear gap of the head being shown at 25. The head has the regular winding 26 thereon. By increasing the level of a direct current in the winding 26, or by pivoting the cores 23 and 24 near gap 22 and adjustment of the gap 25 by screw 27 in ears 28 and 29 on the rear ends of cores 23 and 24, respectively, the strength of the leakage flux into the record medium may be varied for average signal levels to provide different degrees of magnetization of the medium, depending upon the average level of the audio signal or bias current.

When the level of the bias current or wave 8 is increased, it shifts the points 34 and 35 toward points *b* and *d*, respectively, and thus, compression may occur over only the end or shoulder curved portions of the characteristic curve and the positive peaks of the audio wave, the audio negative peaks not going beyond points *a* and *c*, depending upon the level of the audio signal. This increased level also introduces an increased amount of compression into a signal of any given amplitude.

Figure 4:
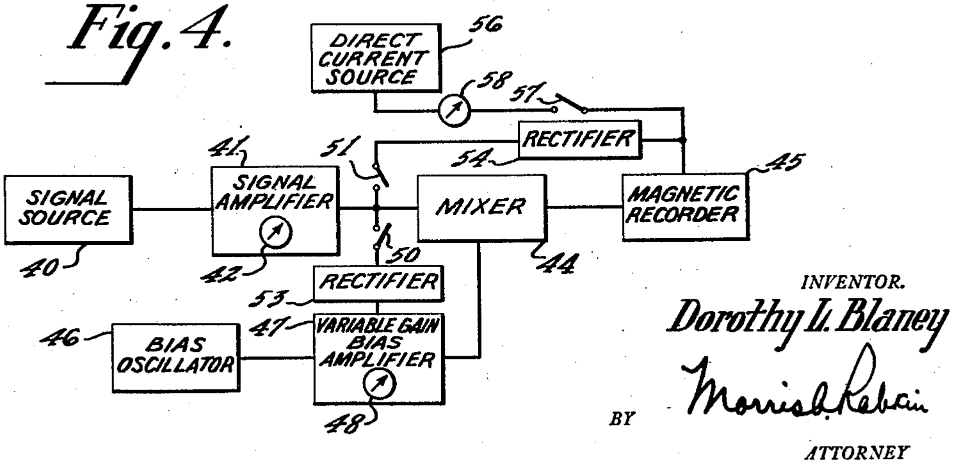
Fig. 4 is a block diagram of a magnetic sound recording system embodying the method of the invention.

Referring now to Fig. 4, a standard commercial form of magnetic recording system is illustrated. A signal source 40 feeds a signal amplifier 41 having a level control such as a potentiometer 42. The output of the signal amplifier is fed to a mixer 44 and then to a magnetic recorder 45, which may have any standard type of recording head or one of the type shown in Fig. 3. In the standard magnetic recorder, a bias oscillator 46 is used, oscillator 46 being connected to a bias amplifier 47 having a level control such as a potentiometer 48. The output of the amplifier 47 is fed to the mixer 44 as is well-known in the art. The amplifier 47 may be of the variable gain type, although when the gain is not varied, it functions in the manner of a normal fixed gain amplifier.

Shown bridged across the output of the signal amplifier 41, is a circuit having a switch 50 therein and a circuit having a switch 51 therein. When the switch 50 is closed, a portion of the output from the signal amplifier 41 is fed to a rectifier 53 connected with bias amplifier 47. When switch 51 is closed, a portion of the output from signal amplifier 41 is fed to a rectifier 54, the output of which is connected to the magnetic recorder 45, and particularly to the windings of the recorder head. A source of direct current is shown at 56 which may be connected to the windings of the magnetic head in recorder 45 when the switch 57 is closed. The level of the direct current is set by a potentiometer 58.

The above recording system may function in several ways, depending upon the operation of the switches 50, 51, and 57. In normal operation, these switches are open, and the amount of compression is then determined by the setting of potentiometer 42 which increases the level of the audio signal, such as shown at 7 and 7' in Fig. 1. The point at which compression begins is controlled by the setting of the potentiometer 48 in the bias amplifier 47, although this adjustment also has an effect on the amount of compression introduced in the signal record. Thus, as described above, the point at which compression occurs along the characteristic curve 14 of Fig. 2 and the amount of compression recorded with signal amplitude may be controlled as shown by curves 30, 31, and 32.

If it is desired to variably shift the point at which compression occurs in accordance with the average value of the signal amplitude, the switch 50 may be closed. A portion of the signal is now rectified and varies the gain of bias amplifier 47 with the average value of the signal amplitude, thus shifting the point of compression as the amplitude varies. This system may function in two ways. First, increased signal levels may increase the output of the bias amplifier, thus moving the point at which compression occurs up on the curve 14. Secondly, the reverse connection may be made so that increased signal levels decrease the output of the bias amplifier, thus shifting the point at which compression occurs downwardly on the curve 14.

Another manner of operation is when the switch 51 is closed and switch 50 opened. With these connections, part of the signal is rectified and impressed on the windings of the recording head, thus increasing the saturation and shifting the point at which compression occurs, and also varying the amount of compression at certain amplitudes. Thus, the compression will vary with the average value of the signal. However, if it is desired to provide a fixed point at which compression occurs and a fixed amount of compression for a certain average level, switches 50 and 51 are opened and switch 57 closed, and a fixed amount of direct current will then be applied to the windings, according to the setting of potentiometer 58. With both switches 50 and 51 closed and switch 57 open, the magnetic film medium and the head core material both coact to control the compression.

The above recording system, therefore, utilizes the characteristics of the magnetic recording medium or the characteristic curves of the core of a recording head or both to provide any particular amount of compression of a signal. This is particularly desirable, as pointed out above, for subsequent reproduction, as it has been found that different types of signals require different treatments from the compression standpoint.

I claim:

1. The method of recording sound signals having a wide amplitude range on a magnetic record medium comprising first, providing a record medium; second, generating sound signals having different amplitudes to be recorded; third, generating a bias current for combining with said sound signals; fourth, rectifying said sound signals to obtain a rectified current varrying in amplitude in accordance with the variations in amplitude of said sound signals; and, fifth, impressing said original sound signals on said medium together with said bias current to compress the higher amplitudes of said sound signals at a predetermined rate at the point of impression of said sound signals on said medium, said rectified current controlling the amplitude of said bias current for varying the amount of compression and the point at which compression occurs.

2. The method of claim 1, in which the high amplitude portions of said signals are compressed by operating on the shoulder of the magnetic characteristic curve of said medium.

3. The method of claim 1, in which the high amplitude portions of said signals are compressed by operating on the shoulder of the magnetic characteristic curve of the magnetic material of a recording head.

4. The method of recording sound signals having a wide amplitude range on a magnetic record medium comprising first, providing a record medium; second, generating sound signals having different amplitudes to be recorded; third, rectifying said sound signals to obtain a rectified current varying in amplitude in accordance with the average variation in amplitude of said sound signals, and fourth, simultaneously impressing said sound signals and said rectified current on said medium for compressing the higher amplitudes of said signals at a predetermined rate at the point of impression of said sound signals and said rectified current on said medium while said sound signals and said rectified current are being so impressed, said compression being controlled by the amplitudes of said sound signals and of said rectified current.

5. The method of claim 4 in which the point at which said compression occurs is raised with an increase in the amplitude of said rectified current.

6. The method of claim 4 in which the point at which said compression occurs is lowered with an increase in the amplitude of the said rectified current.

7. The method of recording sound signals having a wide amplitude range on a magnetic record medium comprising providing a magnetic record medium, generating sound signals to be recorded, said signals having varying amplitudes, rectifying said sound signals to obtain a rectified current varying in amplitude in accordance with the variations in amplitude of said sound signals, impressing said original sound signals on a recording head recording said signals, and controlling the amount of compression of said signals and the point at which compression occurs by said varying amplitude rectified current.

References Cited in the file of this patent

UNITED STATES PATENTS

| | | |
|---|---|---|
| 2,361,752 | Eilenberger | Oct. 31, 1944 |
| 2,604,546 | Connell | July 22, 1952 |
| 2,628,287 | Haynes | Feb. 10, 1953 |

U. S. DEPARTMENT OF COMMERCE

PATENT OFFICE

CERTIFICATE OF CORRECTION

Patent No. 2,816,175 December 10, 1957

Dorothy L. Blaney

It is hereby certified that error appears in the printed specification of the above numbered patent requiring correction and that the said Letters Patent should read as corrected below.

Column 4, line 4, for "characteristics" read -- characteristic curves --.

Signed and sealed this 6th day of May 1958.

(SEAL)

Attest:

KARL H. AXLINE

Attesting Officer

ROBERT C. WATSON

Commissioner of Patents